United States Patent Office 2,888,068
Patented May 26, 1959

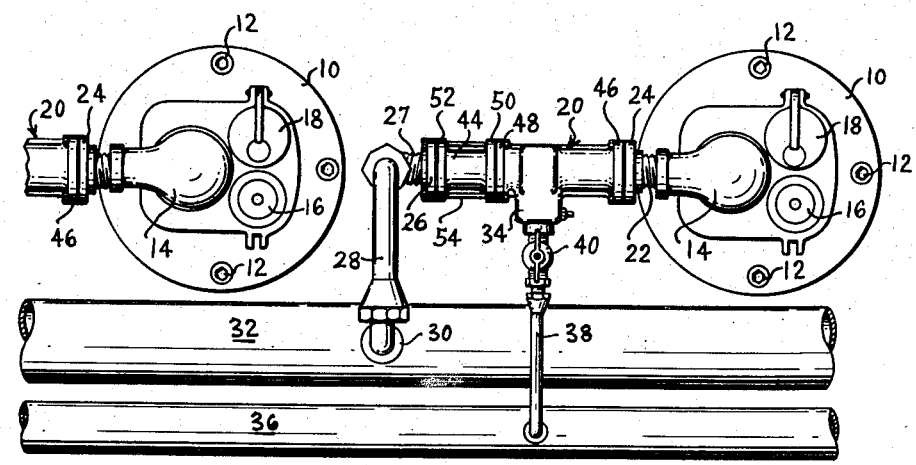

2,888,068

CARBURETING AND MIXING DEVICES FOR GASEOUS FUELS

John H. Flynn, New Rochelle, N.Y.

Application February 27, 1956, Serial No. 568,022

1 Claim. (Cl. 158—118)

This invention relates to carburetor devices and more particularly to devices of the kind intended to apportion and mix gaseous fuels to provide combustible mixtures to be burned in a burner. The device here disclosed is of the gas inspirating, as contrasted to the air inspirating, type and as such is designed to serve with burners of high heating capacity.

Industrial gas burners such as those shown and described in my earlier Patents Nos. 2,499,482, 2,596,229 and 2,647,569, for example, require means for accurately controlling the air-gas ratio in a combustible mixture delivered to them in order to get uniform flame and even distribution of heat throughout, for instance, a baking oven in which a bank or series of such burners is employed. Often it becomes necessary to change the heating capacity of the burners in accordance with changes in the type of product being heated or with changes in the fuel gas employed. And where dusty conditions are encountered, such as flour dust in a bakery, disassembly of the burner equipment to permit cleaning of it is frequently necessary. The invention here is accordingly directed to providing a carburetor or mixer device which serves the foregoing purpose in an especially satisfactory and economical manner.

Gas mixers or proportioning devices of various types have long been known, of course, but the devices here disclosed provide substantial practical advantages in many respects over the previously known types. One of the difficulties with those prior devices has been occasioned by reason of heat warping parts of the mixer which, for reasons of ease of fabrication and economy more especially, are generally castings of low strength gray iron. Along with this there have been further difficulties on account of wear of the parts arising from the necessity for frequent replacement to change the heating capacity of the burners or for cleaning purposes, as mentioned. Such warping and wearing of the parts makes it extremely difficult to maintain tight joints in mixer designs heretofore proposed, and this results in leaks which materially detract from the optimum performance of the burners.

In the mixer design embodying the invention here disclosed, a mechanically simple yet highly effective arrangement of parts assures freedom from leaks in the mixer and from reduction in efficiency thereof on account of warping or wear of parts, as will be discussed more fully hereinafter. And the novel design at the same time eliminates the need for carefully machined mating surfaces for effecting a good seal, which prior devices have incorporated.

Owing to the necessity for frequent changes in certain parts of a mixer, particularly the air metering means, to adapt it for differing burner requirements, it is highly desirable to provide for ready access to these parts without completely disassembling the mixer installation. Prior constructions, for various practical reasons, have not been able to satisfy this requirement. Each mixer, and generally there is one for each burner and some installations incorporate as many as a hundred burners or more, is connected to gas and air supply mains or headers, as well as to the burner inlet. A very large number of piping connections is usually involved, therefore, and the task of disconnecting each mixer from its several connections in order to replace internal parts has accordingly been a troublesome matter heretofore. The invention here makes possible the replacement of internal parts of the mixer without necessity for completely removing the mixer or large sections of the piping leading to it.

As just mentioned, perhaps the most common need for getting to the interior of the mixer is to permit change of the air metering means. Mixers embodying the present invention are of the type employing a venturi tube through which air under pressure is passed and fuel gas is sucked into the air stream through lateral ports located in the venturi tube in the vicinity of its throat or cross section of minimum diameter. The reduced pressure at the venturi ports, owing to the increased velocity of the air at this constricted section, causes the fuel gas to be sucked into the ports in proportion to the amount of air forced through the venturi tube.

A burner of given maximum heating capacity may be operated at different rates of heating within its capacity depending on the amount of air supplied to it. This in turn is conveniently controlled in practice by the size of the throat of the venturi tube. Thus it becomes necessary frequently to change the size of this throat, and whereas it can be done by changing the complete mixer device, it is more convenient and economical to provide the latter with a removable venturi tube. The devices of this invention provide further for a separate, replaceable throat section or orifice plug which can be changed independently of the main body of the venturi tube. While the size and contouring of the diverging walls of the venturi tube downstream from the throat will be somewhat dependent on the size of the throat for optimum results, nevertheless a range of throat sizes for a given venturi tube body portion is entirely satisfactory in actual operation and thus the burner capacity is most advantageously and economically changed by replacement of just the orifice plug to determine the maximum flow of air at a given pressure. In the novel mixer disclosed, the construction is such as to permit replacement of the orifice plug through access from either end of the mixer, resulting in substantially greater ease of maintenance. This advantage is furthered in the arrangement disclosed by incorporating in the mixer body a short section which may be removed laterally of the remainder of the mixer without disturbing the latter or the rest of the burner installation.

In one form of the mixing device thereis also included provision for throttling the fuel gas by restricter means forming an integral part of the mixer assembly and so combined with the gas inlet port of the mixer as to allow easy movement of the gas to the ports of the venturi tube for uniform commingling with the air passing through the mixer. In many mixers heretofore employed, gas does not flow evenly to the several ports around the venturi tube, and stratification occurs in the combustible mixture fed to the burner, resulting in uneven heating. Mixers of the construction disclosed here produce very notably superior results in this respect, as shown by the fact that higher heat capacities are obtained from a given burner for the same air pressure applied to mixers of the same size but of a different design from that here disclosed.

Several specific mixers are illustrated in the accompanying drawings and are described in greater detail hereinafter. These embody the invention in forms presently preferred, but modifications of nonessential details of design may obviously be made without departing from the scope of the invention as defined in the claim.

Referring to the drawings:

Fig. 1 illustrates a portion of a typical multiple burner installation in an oven, the burners themselves being disposed behind respective burner plates and being connected to fuel gas and air headers through mixing devices of the present invention;

Fig. 2 is a longitudinal sectional view, on an enlarged scale, of a mixer shown in Fig. 1, this mixer having a gas ratio control incorporated integrally in the body of the mixer;

Fig. 3 is a view similar to Fig. 2 showing a modified form of mixer having a combined gas ratio and shut-off cock separate from the mixer; and Fig. 4 is an enlarged, longitudinal cross-sectional view of the restricter and shutoff cock of Fig. 3.

The illustration in Fig. 1 shows a small section of a bottom burner installation in a multi-burner industrial furnace or oven. In the illustration, the burner bodies themselves, which may be of the type shown in my prior patents mentioned above, do not appear as these are located behind burner plates 10 and extend rearwardly in a direction perpendicular to the plane of the drawing. The burners are supported at the near wall of the oven by these burner plates 10 which are adapted to be secured to the wall by suitable bolts 12. The opposite ends of the respective burners are suitably supported adjacent the other wall of the oven by pipe framing or other suitable means in conventional manner.

Each of oven plates 10 is provided with three apertures, one of which serves as a feed-through for the gas feed nipple leading to the burner, this nipple being threadedly received within a reducing elbow 14. An ignition electrode 16 is mounted in a second of these apertures, and the third serves as a sight hole through which the burner flame may be observed during operation by lifting the hinged cover 18.

The carbureting or mixing unit 20 to which this invention is primarily directed comprises a two-part, open-ended flanged conduit or housing, one end of which is connected to the reducing elbow 14 by a close nipple 22 threaded into a flanged end plate 24 of the housing. The other end of the housing is similarly provided with a flanged end plate 26 tapped to receive an elbow 27. This is connected to tubing 28 which leads to a tapped boss 30 in an air header or manifold 32. Filtered air is supplied to this header under pressure. Mixer 20 is likewise provided with a tapped lateral boss 34 through which gas is drawn to be mixed with air in the mixer unit, the gas being supplied to the mixer from a gas header 36 through tubing 38 and shutoff cock 40. The gas in this header is maintained at zero or atmospheric pressure by conventional pressure reducer or governor means, not shown.

As has already been mentioned, the body of mixer unit 20 is composed of two conduit sections, these being a main, downstream section 42 and an auxiliary, upstream section 44. Each section is formed to provide flanges at its respective ends, section 42 having flanges 46, 48, and section 44 having flanges 50, 52, at the downstream and upstream ends, respectively. The two sections are joined in axial alignment for the passage of air and gas therethrough by abutment of flanges 48, 50, and are held together in this position by through-bolts 54 and nuts 56. In this instance, these bolts are sufficiently long to extend from flange 48 on section 42 to the flange on the upstream end cap 26, spanning section 44 of the mixer unit. Where the flanges are simply notched peripherally, as here shown, to provide laterally open recesses within which the through-bolts may lie, section 44 of the assemblage can be removed simply by loosening the bolts and lifting one or more from the respective recesses, after which section 44 may be removed laterally to gain access to the interior of the upstream end of section 42. The downstream end of the mixer is secured to the end cap 24 by bolts 58 threaded into the flange of the end cap. Gaskets 62 are provided at each flanged joint to ensure a gas tight seal.

By virtue of this arrangement, the upstream section 44 of the mixer unit may be easily removed without removing the rest of the unit when servicing of it is required, or the whole unit may, if desired, be removed by loosening the bolts at each end, all without disturbing the pipe fitting connections at either end.

Referring now more particularly to the enlarged cross-sectional view of the unit shown in Fig. 2 of the drawings, section 42 of the mixer has an upstream end wall 62 having a threaded aperture 64 therein. The other end of section 42 is counterbored to provide an internal shoulder 66 facing downstream of the mixer, i.e., outwardly of the adjacent open end of the conduit in section 42. A venturi sleeve 68 is disposed concentrically within section 42, the sleeve having an externally threaded upstream end 70 which is received in aperture 64 of end wall 62. Sleeve 68 also has a peripheral flange 72 at its downstream end, which abuts inwardly upon shoulder 66 of section 42 to form an overlapping joint when the sleeve is screwed into the unit. A slot 74 in flange 72 is provided to receive a wide-blade screw driver to facilitate the insertion and removal of the venturi sleeve. The upstream end 70 of the sleeve is threaded interiorly also and receives a threaded orifice plug 76 having a metering passage 78 extending axially therethrough. Adjacent its upstream end, at approximately the point of maximum constriction of the venturi tube 68, there are provided a series of holes or ports 80 which extend through the wall of the sleeve into communication with its interior.

At a point surrounding the constricted area of the venturi sleeve 68, downstream section 42 of the mixer unit is enlarged to form an annular chamber 82 surrounding the sleeve. Gas inlet boss 34 projects outwardly from the mixer at this point and has a passage 84 through it in communication with the annular space 82. The outer end of this passage is internally threaded for the reception of stop cock 40.

Within the passage 84 there is a transverse wall 86, and a hole 88 is bored through this wall. A socket 90 is formed in transverse wall 86, and a variable position restrictor plug 92 is slidably carried therein, being adjustable transversely of the boss. Restrictor plug 92 can thus be moved into blocking positions across the hole 88 by turning a threaded screw stem 94 which passes through and threadedly engages the wall of the boss. A lock nut 96 on the stem holds the restrictor plug in adjusted position once this has been set to give the desired ratio of gas to air.

In operation, air under pressure is supplied to header 32 and passes through the connecting tubing 28 to the upstream end of the mixer unit. In passing through the unit, the increase in velocity of the air at the point of maximum constriction in the venturi tube causes a suction to be produced in annular chamber 82 to draw gas supplied to the inlet end of boss 34 into the interior of the venturi sleeve 68 through ports 80 in the sleeve in well known manner. There it is mixed with the air and passes on into the burner to be burned. In the closed system in which these mixers are used, the gas which is supplied to the mixing unit by header 36 is maintained at atmospheric pressure as previously stated, and the amount of it fed into the burner is determined by the amount of the air passing through the mixer unit. Restrictor plug 92 modifies the proportioning of gas to air which would result from reliance solely upon the size of ports 80 for effecting this, and of course permits easy adjustment of the ratio below the maximum determined by the fixed size of ports 80.

By virtue of the arrangement illustrated, it will be noted that access to the interior of the mixer unit for servicing is readily accomplished. Since the principal servicing requirement in systems of this type is a change in the size of the air passage, making orifice plug 76 removable from the larger sleeve 68 enables changes to be made in burner capacity without costly replacement of large sections of the mixer unit such as the entire sleeve as has heretofore been necessary. While of course the particular shape of the orifice sleeve will theoretically be somewhat different for each airflow velocity employed, as a practical matter a sleeve may be employed which will work very satisfactorily over a fairly wide range of air velocities. Thus any of a set of plugs 76 having passages of different diameter may be interchanged in the mixer unit without appreciable loss of operating efficiency. As will be seen, plug 76 is easily removed from the upstream end of the mixer section 42 when section 44 of the composite mixer unit has been removed as previously described. Should it be necessary for cleaning purposes or other servicing requirements to remove the venturi sleeve 68, this also is easily done by removing bolts 54 and 58 so as to permit lateral removal of the entire mixer assemblage. When this is done, a wide blade screw driver may be inserted in slots 74 in the downstream end of the venturi sleeve 68 and the latter unscrewed from the mixer body.

By reason of the abutment of peripheral flange 72 of sleeve 68 on shoulder 66 of the mixer body, a tight seal of the venturi sleeve at the downstream end of the mixer unit is always assured. This abutment is not dependent upon carefully machined surfaces as in prior constructions, so that wear of the sleeve in removing and replacing it does not affect its ability to be tightly seated in the mixer body and leakage of air back into the gas chamber 82 is easily prevented. Furthermore, the arrangement shown has the advantage of placing the venturi sleeve under light tension between shoulder 66 and end wall 62 within the mixer body, and this helps to prevent any tendency of the sleeve to warp owing to heat transmitted to it from the burner body.

Even flow of gas through each of the ports 80 of sleeve 68 is obtained so that stratification in the combustible mixture fed to the burners does not result.

A modified form of mixer unit is shown in Figs. 3 and 4. This modification embodies the basic arrangement previously described for permitting removal of the orifice plug at the upstream end of the mixer unit separately from the venturi sleeve, or together with the venturi sleeve by removal of the latter from the downstream end of the unit. Externally, however, there are differences in construction and the mixer body illustrated in these figures does not incorporate an integral gas proportioning restrictor. Instead a separate shutoff and proportioning cock is used.

Mixer 100 comprises a single body section 102 having an upstream end 104 tapped to receive elbow 27 directly. This elbow, as in the previous example, is connected to tubing 28 and manifold 32 to supply air to the mixer. At the downstream end, body 102 is flanged at 106, and bolts 108 pass through the flange to secure the mixer to an end cap 110 similar to cap 24. This cap is tapped for the reception of the feed nipple 22 of the burner. A transverse wall 112 in the mixer is apertured centrally and receives in threaded engagement the constricted end of venturi sleeve 68 and air metering orifice plug 76 identical with that previously described. Orifice plug 76 may be removed and replaced in the mixer separately from the sleeve as before by unscrewing elbow 27 from the unit to permit access to the plug at the upstream end of the mixer without removing the whole unit. Flange 72 of sleeve 68 abuts on shoulders 112 of mixer 100 in the same manner as in the previous example to form a tight joint when the sleeve is screwed into the body of the mixer.

A tapped boss 114 on mixer 100 serves as the gas inlet, and a combined shut-off and proportioning cock 116 is threaded into the aperture of the bass. This connects to the gas supply tubing 38 and header 36 in the manner already described. As seen in Fig. 4, cock 116 is of the plug type having a tapered valve plug 118 and a hole 120 through the plug which may be turned into and out of alignment with passage 122 in the body of the plug in well known manner to open or close the passage to the flow of gas therethrough. Plug 118 has a projecting stem 124 which is threaded to receive a nut 126 and a spring 128 is compressed between the nut and a washer 130 to hold the plug in place. Plug 118 is axially counterbored at 132, 134, from the end opposite projecting stem 124, and bore 132 is threaded for the reception therein of a restricter plug 136 having a head 138 and a shank 140 of reduced diameter to make a tight fit in bore 134. Plug 136 may be adjusted longitudinally of its axis within the shutoff cock to restrict passage 122. While restriction could be accomplished by partial misalignment of the hole 120 with the passage 122 by rotating the plug 118 to different settings, the arrangement shown provides a means for repetitively and accurately obtaining a predetermined setting as to the amount of restriction afforded by the plug. This setting is not disturbed each time the stop cock is turned to off position, as it is merely necessary for an attendant to open the cock to a full-open stop position which is permanently fixed in order to obtain the selected setting again. A cap screw 142 is provided to seal the open end of bore 132 above restricter plug 136 against leakage of gas past the latter.

Other modifications within the scope of the invention will be apparent from the foregoing illustrations.

In addition to the various mechanical advantages afforded by the invention in respect to simplicity of fabrication and adjustment for different burner requirements, the mixers are notable for their perfect proportioning of air and gas throughout the entire range of turndown from full on condition to pinpoint low firing of a burner. And this is obtained without encountering backfiring or requiring fire checks of any kind. Moreover, the flame of one or more burners may be turned off without upsetting the mixing and metering action of any of the other burners in the system.

What is claimed is:

A gas inspirating carburetor device for apportioning and mixing combustible gas with air under pressure to provide a combustible mixture for delivery to a high capacity burner, said device comprising a carburetor body defining an open-ended tubular conduit through which air is passed axially thereof, internal threads formed in said body adjacent the upstream end of said conduit, and an internal annular shoulder formed in said conduit and facing outwardly at the downstream end thereof, a venturi sleeve disposed concentrically within said conduit, said sleeve being constricted adjacent its upstream end and having thereat external threads mating with said body threads, and having an external annular shoulder at the downstream end of said sleeve in inward abutment with said body shoulder, said threads and shoulders forming a seal between said body and sleeve when the latter is screwed into said conduit from the downstream end thereof, said conduit and sleeve being peripherally spaced intermediate said threads and shoulders to define between them a sealed annular gas chamber, said sleeve also being threaded internally adjacent its constricted end and having an air metering orifice plug threaded thereinto from said constricted end whereby access may be had from either end of said conduit to said plug for ready replacement thereof, said carburetor body having a lateral port adjacent the constricted portion of said venturi sleeve providing a gas inlet to said gas chamber, and a port formed in said sleeve adjacent said body inlet port to provide a passage for the inspiration of gas from said chamber by the air flowing through said sleeve.

References Cited in the file of this patent

UNITED STATES PATENTS

| | | |
|---|---|---|
| 776,840 | Hogue | Dec. 6, 1904 |
| 1,006,442 | Darwin | Oct. 17, 1911 |
| 1,210,799 | Hawxhurst et al. | Jan. 2, 1917 |
| 1,822,992 | Jones | Sept. 15, 1931 |

FOREIGN PATENTS

| | | |
|---|---|---|
| 354,238 | France | Oct. 2, 1905 |
| 668,760 | Great Britain | Mar. 19, 1952 |